Sept. 29, 1925.
A. S. MOSES
1,555,227
SELF LOADING TRUCK
Filed Oct. 6, 1923　　　2 Sheets-Sheet 1
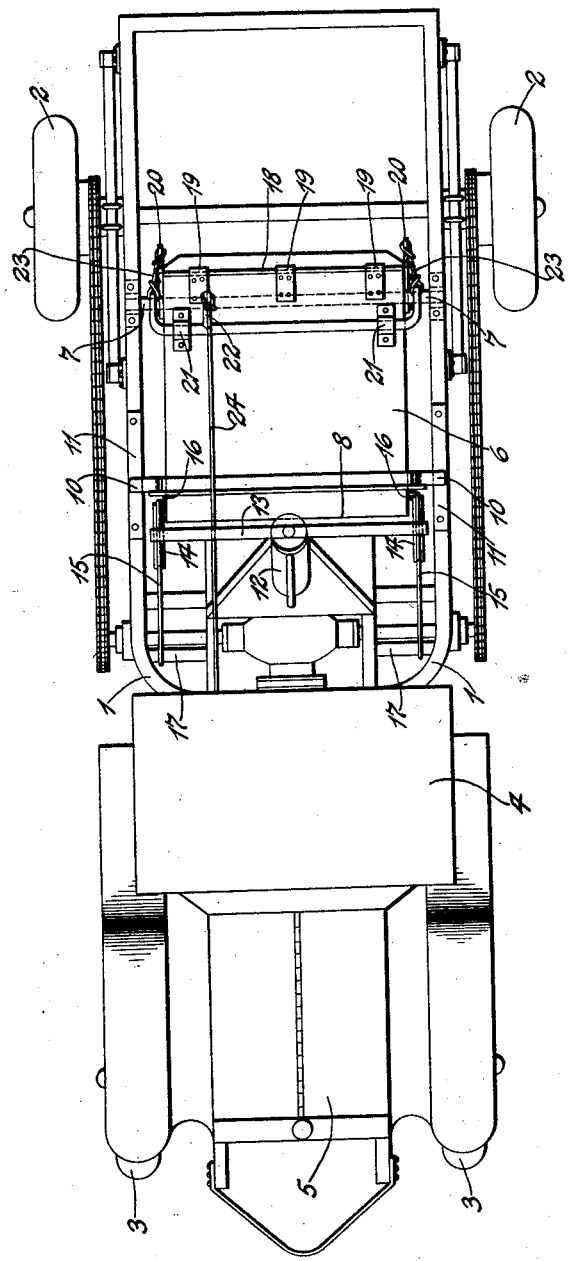
Inventor:
Asheleigh S. Moses,
His Attorney.

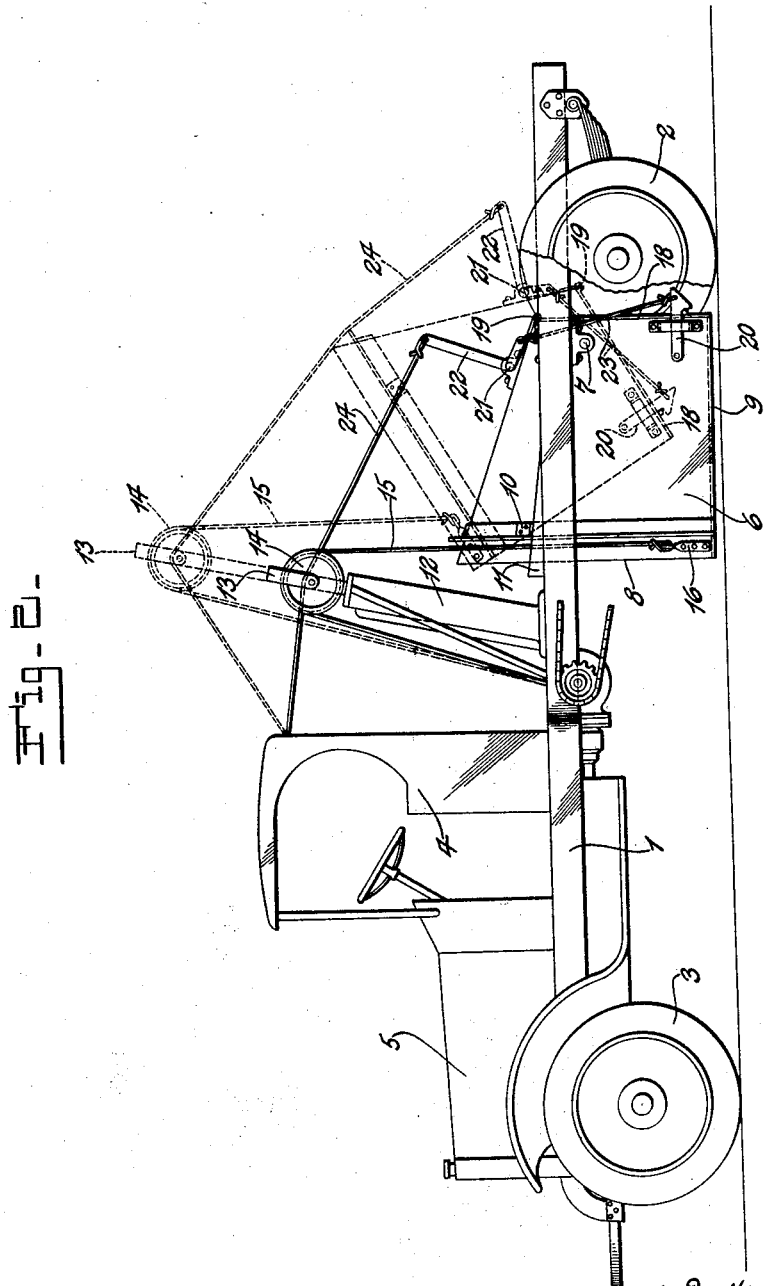

Patented Sept. 29, 1925.

1,555,227

UNITED STATES PATENT OFFICE.

ASHELEIGH S. MOSES, OF ST. LOUIS, MISSOURI.

SELF-LOADING TRUCK.

Application filed October 6, 1923. Serial No. 666,913.

*To all whom it may concern:*

Be it known that I, ASHELEIGH S. MOSES, a citizen of the United States, and residing at St. Louis, State of Missouri, have invented the new and useful Improvement in Self-Loading Trucks, of which the following is a specification.

This invention relates to trucks, and more particularly to self-loading and dumping trucks.

In the handling of certain kinds of materials, particularly materials which may be obtained from a source of supply in which they lie more or less loosely in the ground, it is desirable to provide means for gathering and loading such materials which shall be equipped to pick them up directly from their position on the ground and to haul them away, without the necessity for digging or otherwise handling the same with shovels or the like. One particular application to which a truck of this type is adapted is the gathering of titanium sand which is found in deposits more or less loosely upon the ground and can readily be scooped up.

One of the objects of this invention, therefore, is to provide a truck having a manipulative body adapted to gather the materials directly from their position on the ground to load the body, which may then be moved to traveling position to transport the load.

Another object of this invention is to provide novel means for manipulating such a body and dumping the same when desired.

Further objects will appear from the detail description taken in connection with the accompanying drawings, in which:

Figure 1 represents a plan view of an automobile truck embodying this invention; and Figure 2 represents a side elevation of the same.

In accordance with this invention a truck is provided having a frame or chassis 1, traction wheels 2, steering wheels 3 and a driver's cab 4. A suitable power plant is, of course, provided under a hood 5 and suitably connected to the traction wheels 2. All of these parts may be of any usual or desired form well known in the art.

Mounted on the rearward part of the chassis is a hopper-like body 6 having a form generally tapering toward the bottom. This body is pivoted at 7 on the chassis and is arranged to swing downwardly in a forward direction to the position shown in Figure 2, in which the top or open end 8 is directed toward the front of the truck and the front side 9 is substantially horizontal. The body 6 when in lowered position is supported by the pivots 7 and a pair of stops 10 fixed to the upper and rearward part of the body and adapted to rest when in lowered position on a pair of wedge-shaped abutments 11 mounted on the chassis 1. The wedges 11 may be arranged for adjustment along the chassis so as to raise and lower the position of the stops 10 and, therefore, the position of the body when lowered. By these means the tilt of the body when in lowered position can be adjusted to any desired point so that the forward edge of the body will engage and scoop up the material which it is desired to load. With the body in this lowered position the truck may be driven forward by applying power to the traction wheels 2 and by such movement the body will be moved along the ground so as to scoop up a quantity of material.

Mounted on the chassis 1 adjacent the forward side of the body are elevating means which may comprise a hydraulic cylinder 12 equipped with a cross-bar 13 carrying at its ends a pair of sheaves 14 over which a pair of cables 15 may be passed. These cables are fixed at 16 to the body 6 and after passing over the sheaves 14 are anchored to a cross bar 17 on the chassis. The cylinder 12 may be of any usual well known construction. By operating the cylinder 12 to raise the sheaves 14, the cables 15 will be made to lift the body 6 to an up-right position for traveling. In Figure 2 the body is shown partly raised in dotted lines. After having gathered the material, the body is raised in this way to traveling position and carried to the point of deposit.

At the point of deposit arrangements may be provided for driving the truck over a dumping pit into which the material is to be deposited. The body 6 is provided with a hinged bottom 18 hinged at 19 to the rear of the body and held closed by a latch 20. Pivoted at 21 on the rear of the body 6 is a bell crank lever 22 connected by a link 23 to the latch 20 and by a suitable cord 24 to a manipulative handle (not shown) located in the driver's cab. When the truck has been moved over the dumping pit the driver by pulling the cord 24 may operate the bell crank 22 to release the latch 20, thereby allowing the bottom to fall and deposit the load. When the body is again lowered to horizontal position the bottom will close and be caught by the latch 20.

It will be noted, therefore, that a convenient and economical device for loading material of the kind described is provided by this invention. The hopper-like body is arranged to move on its side so as to scrape up the load therein after which the body is moved to an upright position for carrying the load. The dumping bottom provides a quick and simple method of dumping a load at the desired place. By means of this invention the material can be very quickly gathered and deposited at a minimum expense.

It is obvious that various changes may be made in details of construction without departing from the spirit of this invention; it is, therefore, to be understood that this invention is not to be limited to the specific details shown and described.

Having thus described the invention, what is claimed is:

1. An automobile truck comprising, a chassis, running gear, a body closed at all sides and open at the top and mounted for movement on said chassis, means for moving said body on its side with the open top forward in order to scrape the load therein and to an upright position in order to carry the load, and a dumping bottom for said body.

2. An automobile truck comprising, a chassis, running gear, a body closed at all sides and open at the top and mounted for movement on said chassis, means for moving said body on its side with the open top forward in order to scrape the load therein and to an upright position in order to carry the load, a dumping bottom for said body, and a releasable latch for securing said bottom.

3. An automobile truck comprising, a chassis, running gear, a body closed at all sides and open at the top and mounted for movement on said chassis, means for moving said body on its side with the open top forward in order to scrape the load therein and to an upright position in order to carry the load, and a dumping bottom hinged to the rear side of said body.

4. An automobile truck comprising, a chassis, running gear, a body closed at all sides and open at the top and mounted for movement on said chassis, means for moving said body on its side with the open top forward in order to scrape the load therein and to an upright position in order to carry the load, a dumping bottom hinged to the rear side of said body, and a releasable latch for securing the free end of said bottom.

5. An automobile truck comprising, a chassis, running gear, a body closed at all sides and open at the top and mounted for movement on said chassis so as to lie on its side with the open top forward in order to scrape the load therein, elevating means arranged adjacent the forward end of said body adapted to move it to an upright position in order to carry the load, and a dumping bottom for said body.

6. An automobile truck comprising, a chassis, running gear including traction wheels, a motor for driving said wheels, a body closed at all sides and open at the top and mounted for movement on said chassis and forwardly of said traction wheels, means for moving said body on its side with the open top forward in order to scrape the load therein and to an upright position in order to carry the load, and a dumping bottom for said body.

7. An automobile truck comprising, a chassis, running gear including traction wheels, a motor for driving said wheels, a body closed at all sides and open at the top and mounted for movement on said chassis and forwardly of said traction wheels so as to lie on its side with the open top forward in order to scrape the load therein, elevating means arranged adjacent the forward end of said body adapted to move it to an upright position in order to carry the load, and a dumping bottom for said body.

8. An automobile truck comprising, a chassis, running gear, a body closed at all sides and open at the top and mounted for movement on said chassis, means for moving said body on its side with the open top forward in order to scrape the load therein and to an upright position in order to carry the load, a dumping bottom for said body, and means for adjusting the scraping position of said body.

In testimony whereof I affix my signature this day of July 23, 1923.

ASHELEIGH S. MOSES.